United States Patent [19]

Wakabayashi et al.

[11] Patent Number: 5,109,064
[45] Date of Patent: Apr. 28, 1992

[54] CURABLE COMPOSITION

[75] Inventors: Hiroshi Wakabayashi; Katsuhiko Isayama, both of Kobe, Japan

[73] Assignee: Kanegafuchi Kagaku Kogyo Kabushiki Kaisha, Osaka, Japan

[21] Appl. No.: 463,910

[22] Filed: Jan. 16, 1990

Related U.S. Application Data

[63] Continuation of Ser. No. 246,102, Sep. 19, 1988, abandoned, which is a continuation-in-part of Ser. No. 112,979, Oct. 27, 1987, abandoned.

[30] Foreign Application Priority Data

Oct. 29, 1986 [JP] Japan .................. 61-257628

[51] Int. Cl.$^5$ ............................................. C08L 83/14
[52] U.S. Cl. ................................... 525/100; 525/404
[58] Field of Search ........................... 525/100, 404

[56] References Cited

U.S. PATENT DOCUMENTS 5,030,691 7/1991 Kohmitsu ..................... 525/100

Primary Examiner—Melvyn I. Marquis
Assistant Examiner—R. Dean, Jr.
Attorney, Agent, or Firm—Armstrong, Nikaido, Marmelstein, Kubovcik & Murray

[57] ABSTRACT

A curable composition formed from:
(A) a copolymer that has silicon-containing functional groups capable of crosslinking by forming siloxane bonds and molecular chain containing:
  (1) at least one monomeric unit selected from the group consisting of short chain alkyl acrylate esters and short chain alkyl methacrylate esters, said short chain alkyl groups having 1 to 8 carbon atoms, and
  (2) at least one monomeric unit selected from the group consisting of long chain alkyl acrylate esters and long chain alkyl methacrylate esters, said long chain alkyl groups having 10 to 30 carbon atoms;
wherein the total amount of the monomeric units (1) and (2) in said copolymer is at least 50 weight %, and
(B) an oxyalkylene polymer having silicon-containing functional groups that are capable of crosslinking by forming siloxane bonds; and
(C) a curing accelerator,
wherein copolymer (A) is present in an amount of 5 to 5,000 parts by weight per 100 parts by weight of oxyalkylene polymer (B), and curing acelerator is present in an amount of 0.1 to 20 parts by weight per 100 parts by weight of the sum of copolymer (A) and oxyalkylene polymer (B).

6 Claims, 1 Drawing Sheet

CURABLE COMPOSITION

This application is a continuation of application Ser. No. 246,102 filed Sep. 19, 1988, now abandoned, which is a continuation-in-part of application Ser. No. 112,979, filed Oct. 27, 1987, now abandoned.

BACKGROUND OF THE INVENTION

The present invention relates to a curable composition containing two or more curable polymers. More specifically, it relates to a curable composition that contains an acrylic acid ester and/or methacrylic acid ester based curable polymer, and a curable oxyalkylene polymer, and which has superior mechanical properties, transparency, storage stability and weather resistance. In the following description, an acrylic acid ester and/or methacrylic acid ester is referred to as a (meth)acrylic acid ester.

The present inventors previously found that a (meth)acrylic acid ester based polymer having silicon-containing functional groups that are capable of crosslinking by forming siloxane bonds either at terminals or in side chains (this type of silicon-containing functional groups is hereinafter referred to as reactive silicon functional groups) crosslinks at normal temperatures by reacting with moisture, particularly the moisture in the air, to form a network structure, thereby yielding a cured product having good properties such as high weather resistance, hardness and water resistance. The present inventors accomplished an invention based on this finding and filed a Japanese patent application (OPI) No. 36395/79 (hereinafter OPI is referred to as unexamined published Japanese patent application).

Oxyalkylene polymers having reactive silicon functional groups have been proposed in many patents such as Japanese Patent Publication Nos. 36319/70, 12154/71, 32673/74, and Japanese Patent Application (OPI) Nos. 156599/75, 73561/76, 6096/79, 82123/80, 123620/80, 125121/80, 131022/80, 135135/80 and 137129/80.

The prior art (meth)acrylic acid ester based polymers containing reactive silicon functional groups have superior performance but, on the other hand, the cured products thereof are brittle and even with resin compositions having low glass transition points, the cured products have unacceptable physical properties such as low tensile strength and low percent elongation at break.

The cured products of oxyalkylene polymers having reactive silicon functional groups possess better tensile characteristics but there still is the need to achieve further improvements in their characteristics. In addition, all of the known oxyalkylene polymers having reactive silicon functional groups are defective in their performance in that because of the structure of the backbone chains and other factors, they do not possess satisfactory weather resistance and fail to produce adequate bond to various substrates.

Several methods have been proposed as techniques that are capable of eliminating the defects of the prior art oxyalkylene polymers having reactive silicon functional groups. In the method disclosed in U.S. Pat. No. 4,593,068, an oxyalkylene polymer having reactive silicon functional groups are blended with a (meth)acrylic acid ester based polymer optionally having reactive silicon functional groups. This method is effective to some extent for the purpose of improving the initial performance of the oxyalkylene polymer having reactive silicon functional groups but it is not easy to obtain sufficiently compatible composition having good transparency and good storage stability.

Methods are also known in which (meth)acrylic acid ester based monomers are modified by being polymerized in the presence of oxyalkylene polymers having reactive silicon functional groups (see U.S. Ser. No. 759,877, and U.S. Pat. No. 4,618,656 and 4,618,653). These methods are capable of improving properties such as storage stability but they suffer from the disadvantage of reduced production rate, in particular, low production rate per the capacity of the polymerization vessel since the product obtained by preliminary polymerization and reaction must be charged into another polymerization vessel for performing the polymerization of the necessary monomers. Furthermore, if one wants to make a modified oxyalkylene polymer having a different monomer/oxyalkylene polymer ratio, it is necessary to perform polymerization in the presence of the oxyalkylene polymer each time such need arises, which is quite troublesome. It has therefore been desired to attain the intended results by mere blending.

SUMMARY OF THE INVENTION

An object, therefore, of the present invention is to provide a composition that yields a cured product having improved mechanical properties (e.g. tensile characteristics), transparency, storage stability and weather resistance as compared with the cured products of (meth)acrylic acid ester based polymers or oxyalkylene polymers having reactive silicon functional groups or compositions containing (meth)acrylic acid ester based polymer and oxyalkylene polymer.

With a view to eliminating the defects mentioned above of the prior art (meth)acrylic acid ester based polymers or oxyalkylene polymers having reactive silicon functional groups or compositions containing these two polymers, the present inventors undertook intensive studies and found that these defects can be effectively eliminated by a composition having an alkyl (meth)acrylate ester based polymer having a long-chain alkyl group and an oxyalkylene polymer.

The present invention, therefore, relates to a curable composition which comprises:

(A) a copolymer that has silicon-containing functional groups capable of crosslinking by forming siloxane bonds and molecular chain containing:

(1) at least one monomeric unit selected from the group consisting of short chain alkyl acrylate esters and short chain alkyl methacrylate esters, said short chain alkyl group having 1 to 8 carbon atoms, and (2) at least one monomeric unit selected from the group consisting of long chain alkyl acrylate esters and long chain alkyl methacrylate esters, said long chain alkyl group having 10 to 30 carbon atoms;

wherein a total amount of the monomeric units (1) and (2) in said copolymer is 50 weight % or more, and (B) an oxyalkylene polymer having silicon-containing functional groups that are capable of crosslinking by forming siloxane bonds; and (C) a curing accelerator, wherein copolymer (A) is present in an amount of 5 to 5,000 parts by weight per 100 parts by weight of oxyalkylene polymer (B), and curing accelerator is present in an amount of 0.1 to 20 parts by weight per 100 parts by weight of the sum of copolymer (A) and oxyalkylene polymer (B).

DETAILED DESCRIPTION OF THE INVENTION

The composition of the present invention provides a cured product that exhibits improved mechanical properties (e.g. tensile characteristics), weather resistance and good bond to various substrates as compared with the prior art (meth)acrylate ester based polymers or oxyalkylene based polymers containing reactive silicon functional groups. Further, whether it is in a cured or uncured state, this composition remains highly transparent and stable over time (i.e., even if it is stored for a prolonged time, it will not become turbid or separate into two layers) as compared with the prior art composition comprising (meth)acrylate ester based polymer and oxyalkylene based polymer, as disclosed in U.S. Pat. No. 4,593,068. It is not completely clear why the composition of the present invention affords such advantages, but presumably this is because of the cross-linking reaction between reactive silicon functional groups that occurs subsequent to the solubilization and compatibilization of the alkylene oxide polymer caused by the long-chain alkyl group in the alkyl (meth)acrylate ester based polymer employed in the present invention. In other words, the advantages of the composition of the present invention would result from the formation of a certain type of IPN (interpenetrating polymer network) structure (see D. Klempner and K. C. Frisch, "Polymer Alloys" vol. 2, Plenum Press, New York, 1980, at p. 338)).

The curable copolymer which is used as component (A) in the present invention [this copolymer is hereinafter referred to as copolymer (A)] consists substantially of an alkyl (meth)acrylate ester monomeric unit (1) having a short chain alkyl group with 1 to 8 carbon atoms and an alkyl (meth)acrylate ester monomeric unit (2) having a long chain alkyl group with 10 to 30 carbon atoms. The monomeric unit (1) is represented by general formula (I):

(I)

where $R^1$ is a short chain alkyl group having 1 to 8 carbon atoms; and $R^2$ is a hydrogen atom or a methyl group. The monomeric unit (2) is represented by general formula (II):

(II)

where $R^2$ is the same as defined above; and $R^3$ is a long chain alkyl group having 10 to 30 carbon atoms.

Examples of $R^1$ in the general formula (I) include alkyl groups having 1 to 8, preferably 1 to 4, more preferably 1 and 2 carbon atoms such as methyl, ethyl, propyl, n-butyl, t-butyl and 2-ethylhexyl. The alkyl groups as $R^1$ may be present either alone or in admixture.

Examples of $R^3$ in the general formula (II) include long chain alkyl groups having 10 to 30 preferably 10 to 20, carbon atoms such as lauryl, tridecyl, cetyl, stearyl and behenyl (alkyl having 22 carbon atoms). As in the case of $R^1$, the alkyl groups represented by $R^3$ may be present either alone or in admixture of two or more alkyls such as, for example, alkyls having 12 and 13 carbon atoms.

The molecular chain of the copolymer (A) is substantially composed of the monomeric units (1) and (2). The term "substantially" means that the sum of the monomeric units (1) and (2) present in copolymer (A) exceeds 50 wt % of said copolymer. The sum of the two monomeric units is preferably at least 70 wt % of the copolymer (A).

The weight ratio of monomeric unit (1) to (2) is preferably in the range of 95:5 to 40:60, more preferably in the range of 90:10 to 60:40.

The copolymer (A) may contain monomeric units in addition to the monomeric units (1) and (2) and examples of such optionally present monomeric units include: carboxylic-containing monomers such as acrylic acid and methacrylic acid; amide-containing monomers such as acrylamide, methacrylamide, N-methylol acrylamide and N-methylol methacrylamide; epoxy-containing monomers such as glycidyl acrylate and glycidyl methacrylate; amino-containing monomers such as diethylaminoethyl acrylate, diethylamino ethyl methacrylate and aminoethyl vinyl ether; and monomeric units derived from such compounds as acrylonitrile, styrene, α-methylstyrene, alkylvinyl ether, vinyl chloride, vinyl acetate, vinyl propionate, and ethylene.

From the viewpoint of ease of handling, the copolymer (A) preferably has a number average molecular weight of 500 to 100,000.

The reactive silicon functional groups in copolymer (A), or the silicon-containing functional groups that are capable of crosslinking by forming siloxane bonds, are well known in the art and are characterized by their ability to crosslink even at room temperature. Typical examples of such reactive silicon functional groups are represented by general formula (III):

(III)

where $R^4$ is a substituted or unsubstituted monovalent organic group having 1 to 20 carbon atoms or a triorganosiloxy group; X which may be of a different or same is a hydroxyl group or a hydrolyzable group; a is an integer of 0, 1 or 2; b is an integer of 0, 1, 2 or 3, with proviso that when a is 2, b is not 3; and m is an integer of 0 to 18.

Reactive silicon functional groups which are preferred for such reasons as economy are represented by general formula (IV):

(IV)

where $R^4$ and X are the same as defined above; n is an integer of 0, 1 or 2.

In order to ensure satisfactory curability, the copolymer (A) preferably contains at least 1, more preferably at least 1.1, and most preferably at least 1.5 units of reactive silicon functional groups on average. Preferably, the copolymer (A) contains an apparent number average molecular weight of 300 to 4,000 per reactive silicon functional group.

Specific examples of the hydrolyzable group in formula (III) include a halogen atom, a hydrogen atom, an alkoxy group, an acyloxy group, a ketoximate group, an amino group, an amido group, an aminoxy group, a mercapto group and an alkenyloxy group. Among these examples, alkoxy groups such as methoxy and ethoxy are preferred since they will undergo hydrolysis under mild conditions.

Specific examples of $R^4$ in formula (III) include alkyl groups such as methyl and ethyl, cycloalkyl groups such as cyclohexyl, aryl groups such as phenyl, and aralkyl groups such as benzyl, wherein said cyclohexyl, phenyl or benzyl group may optionally be substituted with halogen. In formula (III) or (IV), $R^4$ may be a triorganosiloxy group represented by the following formula:

where $R^4$ is the same as defined above. A particularly preferred example of $R^4$ in formula (III) or (IV) is methyl.

The copolymer (A) used in the present invention can be prepared by vinyl polymerization, for example, vinyl polymerization initiated by radical reaction in solution polymerization, bulk polymerization or any other conventional procedures of polymerization of monomers that provide the units represented by formulae (I) and (II).

The polymerization is carried out by reacting the necessary monomers and optional additives such as a radical initiator at 50° to 150° C., preferably in the presence of a chain transfer agent, such as n-dodecyl mercaptan or t-dodecyl mercaptan, which is optionally employed in order to attain a copolymer (A) having a number average molecular weight of 500 to 100,000. A solvent may or may not be used and if it is used, it is preferably selected from among non-reactive solvents such as ethers, hydrocarbons and acetate esters.

Reactive silicon functional groups may be introduced into the copolymer (A) by various methods such as: (a) a method wherein a compound such as $CH_2=CHSi(OCH_3)_3$ that has polymerizable unsaturated bonds and reactive silicon functional groups is added to monomers that provide the units represented by formulae (I) and (II) and the individual monomers are copolymerized; and (b) a method wherein a compound such as acrylic acid having polymerizable unsaturated bonds and reactive functional groups (hereinafter abbreviated as Y group) is added to monomers that provide the units represented by formulae (I) and (II) and thereafter, the resulting copolymer is reacted with a compound that has functional silicon groups and functional groups capable of reacting with Y group (the latter functional groups are hereinafter abbreviated as Y' functional group), such as a compound having both an isocyanate group and the group $-Si(OCH_3)_3$.

An example of the compound having polymerizable unsaturated bonds and reactive silicon functional groups may be represented by general formula (V):

(V)

where $R^5$ is a residual organic group having a polymerizable unsaturated bond; and $R^4$, X, a, b and m are each the same as defined above. A preferred example of the compound of formula (V) is represented by general formula (VI):

(VI)

where $R^2$, X and n are each the same as defined above; Q is a divalent organic group such as $-COOR^6-$ (where $R^6$ is a divalent alkylene group having 1 to 6 carbon atoms such as $-CH_2-$ or $-CH_2CH_2-$), $-CH_2C_6H_5CH_2CH_2-$, $-CH_2OCOC_6H_4COO(CH_2)_3-$; and p is 0 or 1.

Specific examples of the compounds represented by formulae (V) and (VI) are listed below:

These silane compounds can be synthesized by various methods, one of which comprises reacting a compound such as acetylene, allyl acrylate, allyl methacrylate or diallyl phthalate with a compound such as methyl dimethoxysilane or methyl dichlorosilane in the presence of a catalyst containing a transition metal of Group VIII of the Periodic Table. An effective catalyst may be a compound of a metal of Group VIII selected from platinum, rhodium, cobalt, palladium and nickel. Particularly preferred compounds are platinum based, such as platinum black, chloroplatinic acid, platinum alcohol compound, platinum-olefin complex, platinum-aldehyde complex, and platinum-ketone complex.

Method (b) that can be employed to introduce reactive silicon functional groups into copolymer (A) is hereinafter described with reference to an illustrative example. While various combinations of groups may be employed as Y and Y' groups, a vinyl group and a hydrosilicon group (H-Si-) may respectively be used. The Y and Y' groups are capable of bonding to each other through a hydrosilylation reaction. Examples of the compound that has not only a vinyl group as Y group but also a polymerizable unsaturated bond are listed below: allyl acrylate, allyl methacrylate, diallyl phthalate, neopentyl glycol diacrylate, neopentyl glycol dimethacrylate, 1,5-pentanediol diacrylate, 1,5-pentanediol dimethacrylate, 1,6-hexanediol diacrylate, 1,6-hexanediol dimethacrylate, polyethylene glycol diacrylate, polyethylene glycol dimethacrylate, polypropylene glycol diacrylate, polypropylene glycol dimethacrylate, divinylbenzene, and butadiene.

A typical example of the compound having not only a hydrosilicon group as Y' group but also a reactive silicon functional group may be a hydrosilane compound represented by general formula (VII):

$$H\!-\!\!\left[\!\begin{array}{c}R^4_a\\|\\Si-O\\|\\X_{2-a}\end{array}\!\right]_m\!\!\begin{array}{c}R^4_b\\|\\Si-X_{3-b}\\|\end{array} \quad (VII)$$

where $R^4$, X, a, b and m are each the same as defined above.

The hydrosilane compounds of formula (VII) may be exemplified but are in no way limited by the following: halogenated silanes such as trichlorosilane, methyldichlorosilane, dimethylchlorosilane and trimethylsiloxydichlorosilane; alkoxysilanes such as trimethoxysilane, triethoxysilane, methyl dimethoxysilane, phenyl dimethoxysilane, and 1,3,3,5,5,7,7-heptamethyl-1,1-dimethoxytetrasiloxane; acyloxysilanes such as methyl diacetoxysilane and trimethylsiloxymethyl acetoxysilane; ketoximate silanes such as bis(dimethylketoximate)methylsilane, bis (cyclohexylketoximate)methylsilane, and bis(diethylketoximate)trimethylsiloxysilane; hydrosilanes such as dimethylsilane, trimethylsiloxysilane and 1,1-dimethyl-3,3-dimethyldisiloxane; and alkenyloxysilanes such as methyl di(isopropenyloxy)silane.

For reaction with a C=C bond, the hydrosilane compound may be used in any amount with respect to the C=C bond but is preferably used in an amount of 0.5 to 2.0 moles per mole of the C=C bond. A greater amount of silane may be employed, however, any excess silane will be simply recovered as unreacted hydrosilane.

The reaction between the hydrosilane compound and the C=C bond requires a catalyst made of the aforementioned compound of a transition metal of group VIII. This hydrosilylation reaction is accomplished at any temperature between 50° and 130° C. and the reaction time generally ranges from about 1 to 10 hours.

Halogenated silanes which are inexpensive and highly reactive stock materials may be readily employed as hydrosilane compounds.

If halogenated silanes are used, the resulting copolymer (A), when exposed to the air, will rapidly cure at normal temperatures while releasing hydrogen chloride. Since the released hydrogen chloride will produce an irritating odor or cause corrosion, the cured product can be used in only limited practical applications. It is therefore preferable to convert the bonded halogen atom to a suitable hydrolyzable group or hydroxyl group. Illustrative hydrolyzable groups include alkoxyl, acyloxy, aminoxy, phenoxy, thioalkoxy and amino groups.

Specific methods for converting a halogen atom to an alkoxy group are described below:

(1) reacting the halogen atom with an alcohol such as methanol, ethanol, 2-methoxyethanol, sec-butanol or tert-butanol, or with a phenol;

(2) reacting the halogen atom with an alkali metal salt of an alcohol or a phenol; and (3) reacting the halogen atom with an alkyl orthoformate such as methyl orthoformate or ethyl orthoformate.

Specific methods for converting a halogen atom to an acyloxy group are described below:

(1) reacting the halogen atom with a carboxylic acid such as acetic acid, propionic acid or benzoic acid; and (2) reacting the halogen atom with an alkali metal salt of a carboxylic acid.

Specific methods for converting a halogen atom to an aminoxy group are described below:

(1) reacting the halogen atom with a hydroxylamine such as N,N-dimethylhydroxylamine, N,N diethylhydroxylamine, N,N-methylphenylhydroxylamine or N-hydroxypyrrolidine; and (2) reacting the halogen atom with an alkali metal salt of a hydroxylamine.

Specific methods for converting a halogen atom to an amino group are described below:

(1) reacting the halogen atom with a primary or secondary amine such as N,N-dimethylamine or N,N-methylphenylamine or pyrrolidine; and (2) reacting the halogen atom with an alkali metal salt of a primary or secondary amine.

Specific methods for converting a halogen atom to a thioalkoxy group are listed below:

(1) reacting the halogen atom with a thioalcohol such as ethyl mercaptan, or with a thiophenol; and (2) reacting the halogen atom with an alkali metal salt of a thioalcohol or a thiophenol.

As described above, the halogen atom on the silyl group introduced into the C=C bond by hydrosilylation reaction can be converted to another hydrolyzable group. In addition, other groups such as alkoxy or acyloxy in the introduced silyl group may also be converted to another hydrolyzable group (e.g. amino or aminoxy) or a hydroxyl group.

When hydrolyzable groups on the silyl group that is directly introduced by hydrosilylation reaction are converted to other hydrolyzable groups, a temperature in the range of 50° to 150° C. is suitably employed. This conversion reaction may be performed with or without a solvent. If a solvent is to be used, an inert solvent such as an ether, a hydrocarbon or an acetate ester is used with advantage.

An oxyalkylene polymer having reactive silicon functional groups in its molecule [this polymer is hereinafter referred to as oxyalkylene polymer (B)] is also used in the present invention, and examples of oxyalkylene polymer (B) are proposed in many patents such as Japanese Patent Publication Nos. 36319/70, 12154/71 and 32673/74, as well as in Japanese Patent Application (OPI) Nos. 156599/75, 73561/76, 6096/79, 82123/80, 123620/80, 125121/80, 131022/80, 135135/80 and 137129/80.

The molecular chain of oxyalkylene polymer (B) preferably has a recurring unit that is represented by the general formula:

$$-R^7-O-$$

where $R^7$ is a divalent hydrocarbon group having 1 to 8 carbon atoms, preferably a hydrocarbon group having 3 or 4 carbon atoms. It is preferable that the sum of the recurring units: $-R^7-O-$ in oxyalkylene polymer (B) exceeds 50 wt %, specifically 70 wt % of said polymer. Specific examples of $R^7$ include: $-CHCH_2-$ (with $CH_3$), $-CHCH_2-$ (with $C_2H_5$), $-C(CH_3)_2-CH_2-$, $-CH_2CH_2CH_2CH_2-$, etc.

The molecular chain of the oxyalkylene polymer may be composed of recurring units of a single type or two or more different types. A particularly preferred example of $$R^7 \text{ is } -\underset{\underset{\displaystyle CH_3}{|}}{C}HCH_2-.$$

The reactive silicon functional groups in the oxyalkylene polymer (B) are the same as already defined.

In order to attain adequate curability, the oxyalkylene polymer (B) preferably contains at least 1, more preferably at least 1.1, and most preferably at least 1.5, reactive silicon functional groups, on average. Such reactive silicon functional groups are preferably present at terminals of the molecular chain of the oxyalkylene polymer (B).

The oxyalkylene polymer (B) has a number average molecular weight which preferably ranges from 500 to 30,000, more preferably from 3,000 to 15,000. Oxyalkylene polymers (B) may be used either alone or in combination.

The oxyalkylene polymer (B) may be prepared by performing an addition reaction between a hydrogenated silicon compound of formula (VII) and a polyester containing an olefin group represented by general formula (VIII):

$$CH_2=\underset{\underset{\displaystyle R^8}{|}}{C}-R^9-(O)_c- \qquad (VIII)$$

where $R^8$ is a hydrogen atom or a monovalent organic group having 1 to 20 carbon atoms; $R^9$ is a divalent organic group having 1 to 20 carbon atoms; c is an integer of 0 or 1, in the presence of a catalyst made of a metal of group VIII such as platinum.

Other methods for preparing the oxyalkylene polymer (B) are described below:

(1) reacting a hydroxyl-terminated polyoxyalkylene with a polyisocyanate compound such as toluene diisocyanate to form an isocyanate-terminated alkylene oxide polymer, and subsequently reacting the terminal isocyanate group with W group in a silicon compound represented by general formula (IX):

$$W-R^9-\underset{\underset{\displaystyle R^4_n}{|}}{Si}-(X)_{3-n} \qquad (IX)$$

where W is an active hydrogen containing group selected from among a hydroxyl group, a carboxyl group, a mercapto group and an amino group (primary or secondary); and n, $R^4$, $R^9$ and X are each the same as defined above;

(2) performing an addition reaction between an olefin group in an olefin-containing polyoxyalkylene represented by formula (VIII) and a mercapto group in a silicon compound of formula (IX) where W is a mercapto group; and (3) reacting a hydroxyl group in a hydroxylterminated polyoxyalkylene with a compound represented by general formula (X):

where $R^4$, $R^9$, X and n are each the same as defined above. It should, however, be noted that the oxyalkylene polymer (B) may be prepared by other methods.

In the preparation of oxyalkylene polymer (B) part or all of X groups in the reactive silicon functional group may be converted to other hydrolyzable groups or a hydroxyl group. If X group is a halogen atom or hydrogen atom, it is preferably converted to an alkoxy, acyloxy, aminoxy, alkenyloxy, hydroxyl group or some other group. In formula (VIII), $R^8$ is a hydrogen atom or a substituted or unsubstituted monovalent organic group having 1 to 20 carbon atoms, and is preferably a hydrogen atom or a hydrocarbon group, with the former being particularly preferred. In formula (VIII), $R^9$ is a divalent organic group having 1 to 20 carbon atoms and is preferably $-R^{10}-$, $-R^{10}OR^{10}-$, wherein $R^{10}$ is a hydrocarbon group having 1 to 10 carbon atoms, with a methylene group being particularly preferred. The alkylene oxide polymer containing an olefin group of formula (VIII) may be prepared by various methods such as the one disclosed in Unexamined Published Japanese Patent Application (OPI) No. 6097/79 and a method in which an epoxy compound such as ethylene oxide or propylene oxide is polymerized with an olefin-containing epoxy compound such as allyl glycidyl ether producing an alkylene oxide polymer having an olefin group in a side chain.

Examples of the curing accelerator (C) to be used in the present invention include, for example, organotin compounds, acidic phosphate ester compounds, the products of reaction between acidic phosphate ester compounds and amines, saturated or unsaturated polyvalent carboxylic acids or acid anhydrides thereof, and organic titanate compounds.

Illustrative organotin compounds include dibutyltin dilaurate, dioctyltin dimaleate, dibutyltin phthalate, tin octylate and dibutyltin methoxide.

The acidic phosphate ester compounds are, those containing a portion represented by and may be more specifically represented by where d is 1 or 2; and R is an organic residual group. Examples of such organic acidic phosphate esters are listed below:

Illustrative organic titanates are titanate esters such as tetrabutyl titanate, tetraisopropyl titanate and triethanolamine titanate.

In the curable composition of the present invention, 5 to 5,000 parts by weight of copolymer (A) are preferably used per 100 parts by weight of the oxyalkylene polymer (B) since if the proportions of the (A) and (B) are within this range, a significant improvement is attained in the characteristic of the curable composition. More preferably, 5 to 2,000 parts by weight of copolymer (A) are used per 100 parts by weight of the oxyalkylene polymer (B), with suitable weight proportions of (A) and (B) being selected in accordance with the intended use and performance of the curable composition.

The curing accelerator is preferably used in an amount of 0.1 to 20 parts by weight, more preferably 0.5 to 10 parts by weight, per 100 parts by weight of the sum of copolymer (A) and oxyalkylene polymer (B).

As mentioned earlier in this specification, the curable composition of the present invention is characterized by:

(1) solubilization and compatibilization of the oxyalkylene polymer (B) by the action of the long-chain alkyl group in side chains in the copolymer (A); and (2) subsequent fixation of an IPN structure due to the three-dimensional network produced by the reaction of reactive silicon functional groups in the compatibilized state.

On account of these characteristics, the curable composition of the present invention exhibits the following superior performance:

(1) It displays tensile characteristics (e.g., elongation and tensile strength), adhesion strength, impact resistance, weather resistance, water resistance and solvent resistance, which are better than those anticipated from the performance and proportions of the individual polymers;

(2) Compared with the prior art composition which comprises an oxyalkylene polymer and a (meth)acrylate ester based polymer containing reactive silicon functional groups (U.S. Pat. No. 4,593,068), the curable composition of the present invention is highly stable during storage as manifested by the absence of turbidity and separation into two layers; and (3) Because of high compatibility between the two polymers, they may be blended at varying portions over a wide range so as to choose an appropriate property such as hardness and this enables engineering materials having broad-spectrum performance.

The curable composition of the present invention may further contain various components such as fillers, plasticizers and conventional additives.

Usable fillers include ground calcium carbonate, precipitated calcium carbonate, gelatinous calcium carbonate, kaolin, talc, silica, titanium oxide, aluminum silicate, magnesium oxide, zinc oxide and carbon black.

Usable plasticizers include dioctyl phthalate, butylbenzylphthalate, chlorinated paraffin and epoxidized soybean oil.

Examples of the conventional additives that can be used include antisag agents such as hydrogenated castor oil and organic bentonite, coloring agents and antioxidants.

The curable composition of the present invention is useful for many purposes such as adhesives, pressure-sensitive adhesives, paints, film water proofing agents, sealant compositions, templating materials, casting rubber materials and foaming materials.

If the curable composition of the present invention is to be used as a sealing material, a curing catalyst of the type described above is mixed with a formulation of the necessary components in a moisture-free condition and the blend can be stored for a prolonged period without degradation. When the blend is exposed to aerial moisture as required, it cures rapidly to form a good rubber elastomer. In other words, the curable composition of the present invention can be used as a one-component elastomeric sealing material which displays good weather resistance, transparency and tensile elongation.

If the curable composition of the present invention is used as a paint, it exhibits a much higher tensile elongation and weather resistance than is usually anticipated and displays excellent characteristics for use as a highly elastic paint in construction applications, or as a primer or a waterproofing agent in concrete structures.

If the curable composition of the present invention is used as a film waterproofing agent, it exhibits a good balance between breaking strength and elongation while affording high durability and good resistance to water, so it is less sensitive to blistering and spalling than the products prepared by existing techniques.

If the curable composition of the present invention is used as an adhesive, it exhibits high bond strength, in particular, a good balance between peeling bond strength and shearing bond strength, and therefore holds promise for application as an adhesive in building structures.

The following synthesis examples and working examples are given for the purpose of further illustrating the present invention but are in no way to be taken as limiting.

SYNTHESIS EXAMPLES 1-7

Xylene (for its amount, see Table 1 below) was heated at 110° C. To the heated xylene, solutions having a polymerization initiator (azobisisobutyronitrile) dissolved in monomer mixtures (see Table 1) were added dropwise over a period of 6 hours. Postpolymerization was performed for 2 hours to prepare the samples of copolymer (A) shown in Table 1.

TABLE 1

| | Synthesis Example No. | | | | | | |
|---|---|---|---|---|---|---|---|
| | 1 | 2 | 3 | 4 | 5 | 6 | 7 |
| Monomer feed formulation (parts by weight) | | | | | | | |
| butyl acrylate | 63.5 | 445 | 9.5 | 7.4 | 66.6 | 587 | 181 |
| methyl methacrylate | 389 | 23 | 457 | 447 | 400 | — | 389 |
| stearyl methacrylate*[1] | 117 | 119 | — | 117 | 118 | — | — |
| acryester SL*[2] | — | — | 117 | — | — | 6.0 | 18.2 |
| trimethylolpropane trimethacrylate | — | 18.2 | — | — | — | — | — |
| TSMA*[3] | 30.5 | 3.0 | 14.7 | 29.1 | KBM 502*[6] 14.7 | 3.0 | 30.5 |
| mercaptosilane*[4] | — | 11.8 | 12.5 | 12.0 | KBM 802*[7] 18.0 | 11.8 | — |
| AIBN*[5] | 12.0 | 6.0 | 43.2 | 30.0 | 6.0 | 6.0 | 12.0 |
| xylene | 255 | 110 | 262 | 257 | 257 | 110 | 255 |
| Copolymer (A) | | | | | | | |
| number average molecular weight (Mn)*[8] | 9,700 | 9,000 | 2,400 | 3,700 | 4,500 | 8,700 | 9,500 |
| molecular weight distribution (Mw/Mn)*[8] | 1.9 | 3.4 | 2.4 | 1.8 | 1.9 | 3.0 | 2.0 |
| conversion to polymer (%) | 99 | 99 | 98 | 100 | 98 | 100 | 99 |
| solids content in resin (%) | 70 | 85 | 70 | 70 | 70 | 85 | 70 |

*[1]Acryester S ® of Mitsubishi Rayon Company Limited;
*[2]$C_{12}$-$C_{13}$ mixed alkyl methacrylate of Mitsubishi Rayon Company Limited;
*[3]γ-methacryloxypropyl trimethoxysilane;
*[4]γ-mercaptopropyl trimethoxysilane;
*[5]azobisisobutyronitrile;
*[6]γ-methacryloxypropylmethyl dimethoxysilane;
*[7]γ-mercaptopropylmethyl dimethoxysilane;
*[8]measured by GPC.

SYNTHESIS EXAMPLE 8

A pressure-resistant reactor vessel equipped with a stirrer was charged with 800 g of polyoxypropylene having an average molecular weight of 8,000 that had an allylether group introduced at 97% of all the terminals present. Thereafter, the reactor was charged with 19 g of methyldimethoxysilane and 0.34 ml of a solution of chloroplatinic acid catalyst (i.e., a solution having 8.9 g of $H_2PtCl_6 \cdot 6H_2O$ dissolved in 18 ml of isopropyl alcohol and 160 ml of tetrahydrofuran). Reaction was then carried out at 80° C. for 6 hours.

IR spectrophotometry showed that the amount of residual hydrosilicon groups in the reaction solution was negligible. Determination of silicon groups by NMR analysis showed that the reaction product was polyoxypropylene having about 1.7 units of terminal groups per molecule.

SYNTHESIS EXAMPLE 9

The procedures of Synthesis Example 8 were repeated except that polyoxypropylene having an average molecular weight of 6,000 that had an allylether group introduced at 97% of all the terminals present was used to make polyoxypropylene having about 1.7 units of terminal groups per molecule.

EXAMPLES 1 TO 5 AND COMPARATIVE EXAMPLES 1 AND 2

The polyoxypropylene having an average molecular weight of 8,2000 that was prepared in Synthesis Example 8 and each of the copolymer (A) samples prepared in Synthesis Examples 1 to 7 were blended at a solids content ratio of 50/50 and the compatibility of the two polymers in the uncured blend was tested, the results of which are shown in Table 2.

The method of blending two polymers was a follows: to a solution of copolymer (A) that was heated at 50° to 60° C., polyoxypropylene having reactive silicon functional groups at its terminals was added in portions and the mixture was stirred until an intimate blend was obtained. The blend was held at a predetermined temperature and subjected to photometry in a selected glass cell for haze measurement.

in Synthesis Example 2 was also uniform and transparent and even after standing at 50° C. for 14 days, it remained visually transparent although it experienced a slight increase in haze.

EXAMPLES 6 TO 10 AND COMPARATIVE EXAMPLES 3 AND 4

Figure 1:
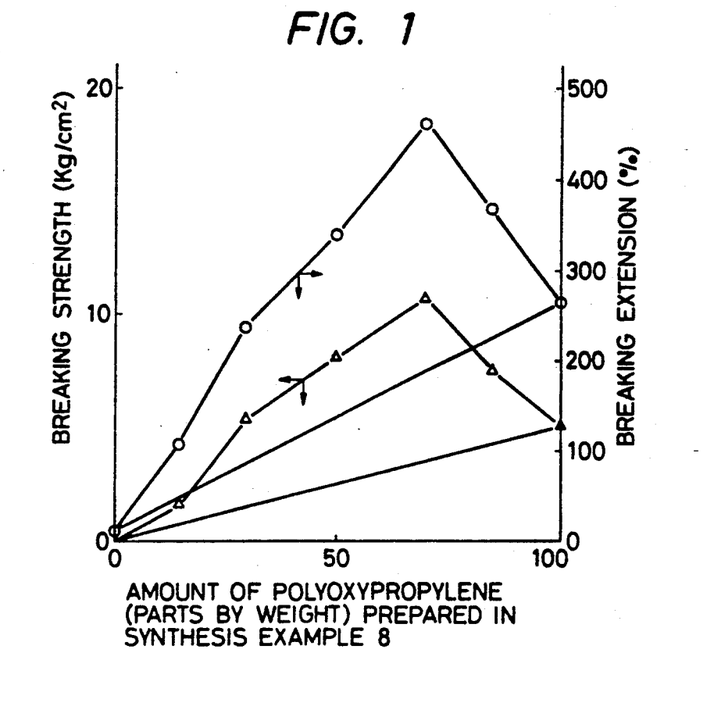
FIG. 1 is a graph showing the tensile strength and elongation at break of sheet as a function of the ratio at which copolymer (A) prepared in Synthesis Example 2 was mixed with polyoxypropylene (B) prepared in Synthesis Example 8.

The sample of copolymer (A) prepared in Synthesis Example 2 and the polyoxypropylene (B) prepared in Synthesis Example 8 were blended in varying proportions of from 100/0 to 0/100 so that the total amount would be 100 parts by weight. To each of the blends thus obtained, dibutyltin phthalate was added as a curing accelerator in an amount of 3 parts by weight with respect to the solids content in resin. The mixtures were cast into sheets having a thickness of 2 to 3 mm, which were cured at room temperature for 7 days and subjected to a tensile test. The results are shown in FIG. 1.

The tensile test was conducted with Dumbbell No. 3 (JIS K6301) at 23° C. with tension applied at a rate of 200 mm/min.

EXAMPLES 11 TO 15 AND COMPARATIVE EXAMPLES 5 AND 6

The sample of copolymer (A) prepared in Synthesis Example 3 and the polyoxypropylene (B) prepared in Synthesis Example 8 were blended in varying proportions of from 100/0 to 0/100 so that the total amount would be 100 parts by weight. To each of the blends thus obtained, dibutyltin phthalate was added as a curing accelerator in an amount of 3 parts by weight with respect to the solids content in resin. After addition of 15 parts by weight of a plasticizer, the mixtures were cast into sheets 2 to 3 mm in thickness, which were cured at room temperature for 7 days and subjected to a tensile test as in Example 6. The results are shown in FIG. 2.

Figure 2:
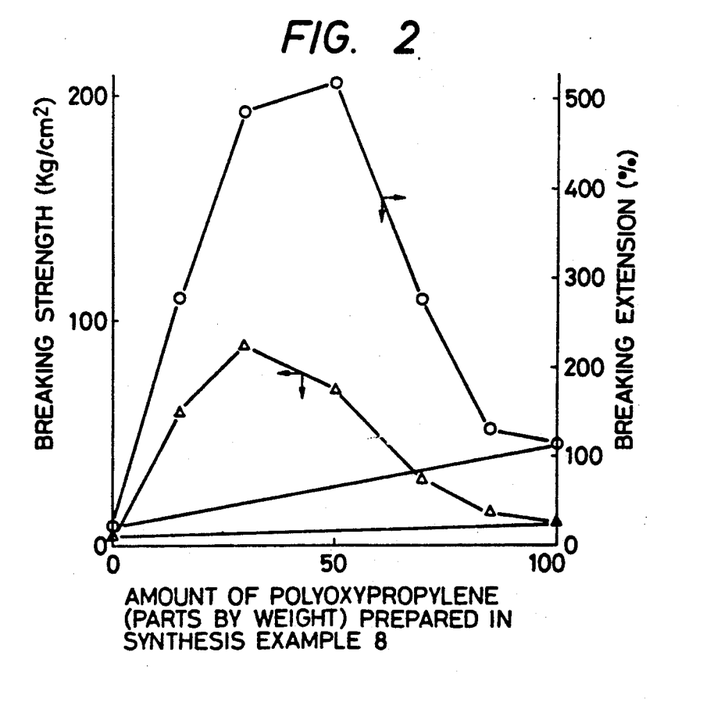
FIG. 2 is a graph showing the tensile strength and elongation at break of sheet as a function of the ratio at which copolymer (A) prepared in Synthesis Example 3 was mixed with polyoxypropylene (B) prepared in Synthesis Example 8.

As is clear from FIGS. 1 and 2, the blends of copolymer (A) and polyoxypropylene (B) exhibited, at all proportions, performance that was better than that indicated by the additive curves obtained by connecting the values of breaking strength and elongation of (A) and

TABLE 2

| Run No. | Copolymer (A) | State immediately after mixing (50° C.) | Haze after standing overnight at R.T. (%) | Haze after standing at 50° C. for 14 days (%) | Compatibility |
|---|---|---|---|---|---|
| Example 1 | prepared in Synthesis Example 1 | Uniform and transparent | 5 | <10 | good |
| Example 2 | prepared in Synthesis Example 2 | " | 22 | 14 | " |
| Example 3 | prepared in Synthesis Example 3 | " | 5 | <10 | " |
| Example 4 | prepared in Synthesis Example 4 | " | 7 | <10 | " |
| Example 5 | prepared in Synthesis Example 5 | " | 9 | <10 | " |
| Comparative Example 1 | prepared in Synthesis Example 6 | uniform but opaque | >90 | separated into two layers | compatible at first but later turned incompatible |
| Comparative Example 2 | prepared in Synthesis Example 7 | separated into two layers | separated into two layers | separated into two layers | incompatible |

The data in Table 2 show that the blends using the v samples of copolymer (A) prepared in Synthesis Examples 1, 3, 4 and 5 were uniform and transparent and remained the same after storage at 50° C. for 14 days. The blend using the sample of copolymer (A) prepared (B) taken individually. Particularly, compositions having superior property to those composed of a single ingredient are existed in wide range.

EXAMPLES 16 AND 17 AND COMPARATIVE EXAMPLES 7 AND 8

The copolymer (A) prepared in Synthesis Example 1 and the polyoxypropylene (B) prepared in Synthesis Example 8 were blended so that the solids content ratio in resin would be 65/35 (Example 16) and 50/50 (Example 17). Using these blends, enamel was prepared in accordance with the paint formulations shown in Table 3 below. To the enamel, 2.5 parts by weight of dibutyltin phthalate was added per 100 parts by weight of the solids content in resin. The mixtures were cast into sheets for a dry thickness of 0.5 to 1.0 mm, and cured at room temperature for 7 days.

The resulting paint films were subjected to a tensile strength test and to an accelerated weather test. The test results are shown in Table 3.

TABLE 3

|  | Comparative Example 7 | Example 16 | Example 17 | Comparative Example 8 |
|---|---|---|---|---|
| Formulation | | | | |
| Copolymer (A) prepared in Synthesis Example 1 | 100 | 65 | 50 | 0 |
| Polyoxypropylene (B) prepared in Synthesis Example 8 | 0 | 35 | 50 | 100 |
| Titanium oxide*[1] | 40 | 40 | 40 | 40 |
| Xylene | 60 | 60 | 60 | 60 |
| Dispersion stabilizer*[2] | 0.3 | 0.3 | 0.3 | 0.3 |
| Ultraviolet absorber*[3] | 0.5 | 0.5 | 0.5 | 0.5 |
| Antioxidant*[4] | 0.5 | 0.5 | 0.5 | 0.5 |
| Dibutyltin phthalate | 2.5 | 2.5 | 2.5 | 2.5 |
| Film characteristics | | | | |
| Breaking strength (kg/cm$^2$) | 120 | 60 | 40 | 12 |
| Elongation at break (%) | 2 | 210 | 350 | 120 |
| Gloss retention in SWM*[5]  500 hr | 97 | 95 | 95 | 0 |
| 1,000 hr | 90 | 87 | 87 | extensive surface cracking |
| 2,000 hr | 85 (partly cracked) | 80 (good) | 80 (good) | |

*[1] CR-90 (product of Ishihara Sangyo Kaisha, Ltd.)
*[2] Byk P1043 (Byk-Mallinckrodt Corp)
*[3] Tinuvin 327 (Ciba-Geigy Ltd)
*[4] Tinuvin 770 (Ciba-Geigy Ltd)
*[5] Sunshine weather-O-meter The data in Table 3 shows the dramatic increase in elongation that was achieved by using blends of copolymer (A) and polyoxypropylene (B) as a paint base. The data also show that such blends exhibited much improved weather resistance as compared with the paint that employed polyoxypropylene (B) as the sole resin component. The film formed from the paint that used copolymer (A) as the sole resin component experienced cracking on account of its hardness and brittleness but such problems were absent from the blends of (A) and (B).

EXAMPLES 18 TO 21 AND COMPARATIVE EXAMPLES 9 AND 10

The copolymer (A) prepared in Synthesis Example 4 and the polyoxypropylene (B) prepared in Synthesis Example 9 were blended in a solids content ratio in resin of 60/40 (Example 18) or 50/50 (Example 19). The solvent was distilled off in a rotary evaporator at 100° C. under vacuum so as to obtain solvent-free resins that were viscous, slightly yellow and transparent.

To each of the resins, 2.5 parts by weight of dibutyltin phthalate, 2.0 parts by weight of an 1 aminosilane compound (A-1120, adhesion promoter of Nippon Unicar Co., Ltd.) and 0.4 part by weight of water were added so as to prepare samples of an adhesive, which were subjected to an adhesion test (for its procedures, see below) using an aluminum substrate. The results are shown in Table 4.

Samples of an adhesive were prepared in Examples 20 and 21 by repeating the above procedures except that the copolymer (A) of Synthesis Example 5 and the polyoxypropylene (B) of Synthesis Example 8 were used. The results of an adhesion test conducted on these adhesive samples are shown in Table 4.

Preparation of Samples for Measurement of T-Shape Peeling Strength and Tensile Test Method (according to JIS K 6854)

The surface of an aluminum plate (A-1050P A1 plate specified in JIS H 4000 that measured 200 mm×25 mm×0.1 mm) was lightly rubbed with acetone and, using a spatula, an adhesive composition was coated in a thickness of ca. 0.3 mm over an area of ca. 25 mm×100 mm. The coated surfaces of two aluminum plates with an adhesive coating were bonded together by means of a hand roller (5 kg) that was allowed to roll along the length of aluminum plates without reciprocating. This roller operation was repeated five times. The resulting sample was cured at 23° C. for day and aged by heating at 50° C. for 3 days. The aged sample was set in a T-shape in a tensile tester and pulled at a rate of 200 mm/min. The load under which the adhesive portion of the sample broke was measured to determine the T-shape peeling strength of the sample.

Preparation of Samples for Measurement of Tensile Shear Strength and Tensile Test Method (according to JIS K 6850)

The surface of an aluminum plate (A-1050P A1 plate specified in JIS H 4000 that measured 100 mm×25 mm×2 mm) was lightly rubbed with acetone and, using a spatula, an adhesive composition was coated in a thickness of ca. 0.05 mm over an area of ca. 25 mm×12.5 mm. The coated surfaces of two aluminum plates with an adhesive coating were bonded together by hand. The resulting sample was cured at 23° C. for one day with the bonded surfaces being fixed. The cured sample was aged by heating at 50° C. for 3 days and subjected to a tensile test at a pull rate of 5 mm/min. The maximum load at which the adhesive portion of the test piece broke was divided by the shear area to determine the tensile shear strength of the sample.

TABLE 4

| | Run No. | | | | | |
|---|---|---|---|---|---|---|
| | Comparative Example 9 | Example 18 | Example 19 | Example 20 | Example 21 | Comparative Example 10 |
| Composition (parts by weight) | | | | | | |
| Copolymer (A) of Synthesis Example 4 | 100 | 60 | 50 | — | — | — |
| Copolymer (A) of Synthesis Example 5 | — | — | — | 60 | 50 | — |
| Polyoxypropylene (B) of Synthesis Example 8 | — | — | — | 40 | 50 | 100 |
| Polyoxypropylene (B) of Synthesis Example 9 | — | 40 | 50 | — | — | — |
| Dibutyltin phthalate | 2.5 | 2.5 | 2.5 | 2.5 | 2.5 | 2.5 |
| Adhesion promoter | 2.0 | 2.0 | 2.0 | 2.0 | 2.0 | 2.0 |
| Water | 0.4 | 0.4 | 0.4 | 0.4 | 0.4 | 0.4 |
| Evaluation | | | | | | |
| T-shape peeling strength (kg/25 mm) | 1.0 | 10.8 | 9.0 | 12.4 | 11 | 3.5 |
| Bonding strength (shear) (kg/cm$^2$) | 15 | 90 | 70 | 107 | 80 | 10 |

The data in Table 4 show that the adhesive employing the curable composition of the present invention exhibited a good balance between peeling strength and shearing bond strength, thereby producing a much higher bond strength than the comparative adhesives employing either copolymer (A) or polyoxypropylene (B) independently.

While the invention has been described in detail and with reference to specific embodiments thereof, it will be apparent to one skilled in the art that various changes and modifications can be made therein without departing from the spirit and scope thereof.

What is claimed is:

1. A curable composition comprising:
   (A) a copolymer having silicon-containing functional groups capable of crosslinking by forming siloxane bonds and molecular chain containing:
      (1) at least one monomeric unit selected from the group consisting of short chain alkyl acrylate esters and short chain alkyl methacrylate esters, said short chain alkyl groups having 1 to 8 carbon atoms, and
      (2) at least one monomeric unit selected from the group consisting of long chain alkyl acrylate esters and long chain alkyl methacrylate esters, said long chain alkyl groups having 10 to 30 carbon atoms;
   wherein the total amount of the monomeric units (1) and (2) in said copolymer is at least 50 weight %, and
   (B) an oxyalkylene polymer having silicon-containing functional groups that are capable of crosslinking by forming siloxane bonds; and
   (C) a curing accelerator, wherein copolymer (A) is present in an amount of 5 to 5,000 parts by weight per 100 parts by weight of oxyalkylene polymer (B), and curing accelerator is present in an amount of 0.1 to 20 parts by weight per 100 parts by weight of the sum of copolymer (A) and oxyalkylene polymer (B).

2. A curable composition according to claim 1, wherein a monomeric unit (1) is represented by formula (I)

where $R^1$ is an alkyl group having 1 to 8 carbon atoms, and $R^2$ is a hydrogen atom or a methyl group; and a monomeric unit (2) is represented by formula (II)

where $R^2$ is the same as defined above, and $R^3$ is an alkyl group having 10 to 30 carbon atoms.

3. A curable composition according to claim 1, wherein a ratio of the monomeric units (1):(2) is 95:4 to 40:60.

4. A curable composition according to claim 1, wherein a copolymer (A) has 500 to 100,000 of number average molecular weight.

5. A curable composition according to claim 1, wherein an oxyalkylene polymer (B) has a repeating unit of formula —$R^7$—O—, wherein $R^7$ is a divalent hydrocarbon group having 1 to 8 carbon atoms.

6. A curable composition according to claim 1, wherein a curing accelerator is selected from the group consisting of an organic tin compounds, organic titanate compounds, acid phosphate esters, reaction products of acid phosphate esters and amines, saturated or unsaturated polycarboxylic acids, and acid anhydrides of saturated or unsaturated polycarboxylic acids.

* * * * *